United States Patent [19]
Fantone et al.

[11] Patent Number: 5,588,526
[45] Date of Patent: Dec. 31, 1996

[54] FLAT BOX SYSTEM WITH MULTIPLE VIEW OPTICS

[75] Inventors: Stephen D. Fantone, Lynnfield, Mass.; Anthony L. Gelardi, Cape Porpoise; John A. Gelardi, Kennebunkport, both of Me.

[73] Assignee: Insight, Inc., Lynnfield, Mass.

[21] Appl. No.: 338,246

[22] Filed: Nov. 14, 1994

Related U.S. Application Data

[63] Continuation-in-part of Ser. No. 222,632, Apr. 1, 1994.

[51] Int. Cl.[6] .................................................. B65D 85/57
[52] U.S. Cl. ..................... 206/308.1; 206/309; 206/310; 206/459.5; 206/232; 40/454; 359/463
[58] Field of Search .............................. 206/308.1, 309, 206/310, 311, 312, 313, 387.1, 387.14, 459.5, 232, 591, 594, 817, 95.28, 45.29; 229/107, 67.1, 72; 281/2, 5; 283/61, 62, 56; 359/463, 809, 23; 40/453, 454

[56] References Cited

U.S. PATENT DOCUMENTS

| | | | |
|---|---|---|---|
| D. 270,319 | 8/1983 | Greenberg | 40/453 X |
| 1,220,515 | 3/1917 | Kantro | 229/72 |
| 2,589,735 | 3/1952 | Salfisberg | 206/484 X |
| 3,076,541 | 2/1963 | Volckening | 206/232 |
| 3,953,869 | 4/1976 | Wah et al. | |
| 3,973,958 | 8/1976 | Bean | |
| 4,004,889 | 8/1977 | Orentreich et al. | |
| 4,120,562 | 10/1978 | Lo et al. | |
| 4,158,501 | 6/1979 | Smith et al. | |
| 4,480,893 | 11/1984 | Fantone | |
| 4,600,297 | 7/1986 | Winnek | |
| 4,606,553 | 8/1986 | Nickerson | 281/5 |
| 4,650,282 | 3/1987 | Lo | 359/462 |
| 4,783,133 | 11/1988 | Chen | 359/23 |
| 4,863,026 | 9/1989 | Perkowski | |
| 4,869,946 | 9/1989 | Clay | |
| 4,895,252 | 1/1990 | Nomula et al. | 206/310 |
| 4,903,069 | 2/1990 | Lam | |
| 4,935,335 | 6/1990 | Fotland | 359/463 X |
| 5,101,971 | 4/1992 | Grobecker | 206/232 |
| 5,189,531 | 2/1993 | Palmer et al. | |
| 5,244,084 | 9/1993 | Chan | 206/309 |
| 5,276,478 | 1/1994 | Morton | |
| 5,279,912 | 1/1994 | Telfer et al. | 359/463 X |

FOREIGN PATENT DOCUMENTS

| | | |
|---|---|---|
| 432360 | 3/1948 | Italy |
| 2222143 | 2/1990 | United Kingdom |

*Primary Examiner*—Paul T. Sewell
*Assistant Examiner*—Tara L. Laster
*Attorney, Agent, or Firm*—Francis J. Caufield

[57] ABSTRACT

Optical arrangements are provided by which observers of flat containers or display boxes, such as compact disc (CD) jewel boxes, can be presented with different information about the contents of the box when looking at one of its surfaces from different angular perspectives. Advantageously, parallax effects are compensated where the size of the observable images and the viewing distance create undesirable visual artifacts. Horizontally and vertically oriented lenticulated panels are used in combination with interlaced images to convey the differently coded views without the need for physically manipulating such boxes as in the past to see equivalent information. Compliant inserts preferably provide the information content of the various views and are adapted for use with industry automated insert machinery while being self aligning with the lenticulated panels. These arrangements enhance the possibilities for displaying more and different kinds of information on a given box surface area compared with conventional approaches, and as such, enhance the prospects for increasing initial and multiple sales of CD products.

38 Claims, 14 Drawing Sheets

FLAT BOX SYSTEM WITH MULTIPLE VIEW OPTICS

CROSS REFERENCE TO RELATED APPLICATION

This application is a continuation-in-part application of U.S. patent application Ser. No. 08/222,632 filed on Apr. 1, 1994.

BACKGROUND OF THE INVENTION

1. Field of the Invention

This invention relates generally to flat storage and display boxes and, more particularly, to optical arrangements for providing enhanced viewing of textual, graphic, and/or other symbolically coded information located on the inside of flat, transparent storage and display boxes for compact discs, audio tapes, or the like.

2. Description of the Prior Art

Compact discs, which were first developed by Philips and Sony in the early 1980s, are now a well-established form of medium for recording a variety of retrievable information. Their popularity and success stem from their compactness, convenience, competitive cost, and high information storing capacity.

Physically, such discs are thin, flat, circular objects approximately 12 cm in diameter by about 1.2 mm thick. They are provided with a central hole about 18 mm in diameter for purposes of mounting them for rotation in various devices capable of reading and writing information to and from them. Typically, audio, video or other data is recorded in digital form on one surface of the disc with the opposite remaining free for carrying information about the contents of the recorded information.

For enabling writing and recording information, a compact disc (CD) comprises a clear plastic layer over a reflective aluminum surface. Data, of whatever type, is stored on the disc in binary code; the 'ones' of the code being dents or pits in the plastic surface while the 'zeros' are represented by smooth plastic. When playing the disc, a laser beam scans the disc surface as it rotates and is reflected back only by the 'zero' areas. Reflected light pulses are picked up by a photodetector which converts them into a digital electrical signal that can then be further processed for subsequent use in various playback devices appropriate for the type of information recorded in the disc.

While very popular for audio recording, CDs also can be used for storing video information, which applies the same technology. These have advantages over magnetic tape by virtue of being easier to replicate and randomly access.

CDs are also used to store large amounts of computer information. Here, CD-ROM (compact disc with read-only memory) is the most common format, but other forms of disc are available that allow data to be written on the disc as well as read.

Recent applications for CD use include the photo-CD, which records still images for viewing on a television screen or reproduction as hard copy, and the multimedia CD, which holds pictures, sound, and text information on one disc and can play it back through television receivers and hi-fi equipment or appropriately configured computer systems.

While CDs are physically robust because information is digitally encoded and optically read, they obviously are not immune to damage and require protection from mishandling and environmental effects which could destroy or compromise their information bearing surfaces or otherwise threaten their physical integrity.

Consequently, CDs are usually shipped, stored and marketed in correspondingly flat containers referred to as "jewel boxes". Such boxes are generally made of a durable, transparent plastic such as polycarbonate or styrene and have been designed to occupy the minimal amount of space consistent with their protective function. As a result of this, and the fact that CDs can carry so much digitally encoded information, space available on the surfaces of the jewel box for providing information about their contents is at a premium, especially since the practice of packaging CDs with "spaghetti" boxes has been discontinued because of environmental pressures associated with the accumulated waste from the sale of large volumes of CDs.

Since the disappearance of the spaghetti box from the marketplace, the current technique for informing CD users about the contents of recorded CD information is to provide the information in the form of thin paper booklets or sheets that are visible through the flat, transparent panels of a jewel boxes' front cover or base, or both. In addition, use is also made of the hinge edge of a box for displaying cryptic information about the title and author or artist of the CD. However, the limited exterior surface area of the conventional CD box, in turn, limits the amount of information that can be seen through any one surface thus requiring relevant information to be distributed among available surfaces. This forces a prospective buyer to flip through stacks of CDs while scanning the front covers in search of the identity of a particular CD, usually by title and/or artist, that may be of interest and then turning the box around to examine the rear surface for information about the detailed contents. Studies have shown that this results in the loss of multiple, and perhaps primary, sales because the process is time consuming and frustrating for the consumer. Hence, there is a need for a solution to the foregoing problems, and it is a primary object of this invention to provide solutions through the use of optical arrangements which enhance the viewing opportunities and amount of information that can be visually detected by a prospective CD owner.

While optical approaches have been used in the past for direct magnification of content information about the insides of containers, none have provided more visual access to more information on the same viewable area or, more importantly, different information viewable through the same box surface. For example, British Patent No. GB 2222143 entitled "BOX-LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES", issued on Sep. 5, 1989 discloses a Fresnel lens incorporated in or on the front cover panel of a case for purposes of magnifying information carded on the surface of a program card inserted in the case such that it lies directly beneath the lens. In like manner, U.S. Pat. No. 4,044,889 entitled "COSMETIC CONTAINER INCLUDING INTEGRATED LENS STRUCTURE", issued on Aug. 30, 1977, also shows a Fresnel lens for magnifying tiny underlying information carried on the interior of a cosmetic container.

U.S. Pat. No. 4,863,026 entitled "STORAGE CASES FOR INFORMATION RECORDING DEVICES", issued in the name of Thomas J. Perkowski on Sep. 5, 1989, discloses a Fresnel lens arranged on the front cover of a magnetic tape, video tape, or compact disc storage box for magnifying information located directly behind the front cover at an appropriate distance.

Similarly, U.S. Pat. No. 4,044,889 entitled "COSMETIC CONTAINER INCLUDING INTEGRATED LENS STRUCTURE", issued to Seymour Orentreich et al. on Aug. 30, 1977, describes the use of Fresnel lens structures for magnifying information located on the interior surfaces of cosmetic containers.

U.S. Pat. No. 5,189,531 entitled "HOLOGRAM PRODUCTION", issued to Charles E. Palmer et al. on Feb. 23, 1993, describes techniques for forming holographic images in cosmetic compact covers or compact audio or video discs or the like.

In view of the known art, there continues to be a demonstrable need for more effective ways of providing significantly improved visual access to flat containers and display boxes for purposes of informing prospective users about the contents of the containers and for making their contents more attractive to induce increased sales. And, it is a primary object of this invention to fulfill this need.

Another object of the present invention is to provide optical arrangements by which the viewable surfaces of flat containers may be exploited to provide views of different information by observing those surfaces from slightly different perspectives.

Yet another object of the present invention is to provide optical arrangements by which encoded information may be provided on a viewable surface.

Yet another object of the present invention is to provide optical viewing arrangements for compact disc containers that can be implemented by relatively minor modification of currently existing molds for fabricating them.

Still another object of the present invention is to provide optical arrangements by which pseudo-dynamic information may be provided to an observer of a flat container box.

Another object of the present invention is to provide an optical arrangement employing a lenticulated surface structured to compensate for parallax effects at customary viewing distances.

Yet still another object of the present invention is to provide informational materials, such as booklets and the like, that can be inserted into flat boxes utilizing existing equipment while lying flat against a flat panel of the box.

Other objects of the invention will be apparent and will appear hereinafter in the following detailed description when read in connection with the drawings.

SUMMARY OF THE INVENTION

Optical arrangements are provided by which observers of flat containers or display boxes, such as compact disc (CD) jewel boxes, can be presented with different information about the contents of the box when looking at one of its surfaces from different angular perspectives. Horizontally and vertically oriented lenticulated panels are used in combination with interlaced images to convey the differently coded views without the need for physically manipulating such boxes as in the past to see equivalent information. These arrangements enhance the possibilities for displaying more and different kinds of information on a given box surface area compared with conventional approaches and, as such, enhance the prospects for increasing initial and multiple sales of CD products.

The interlaced images may be carried on card inserts in optical registration with the lenticulated surfaces, printed on interior surfaces of the box or front surface of a compact disc, or some combination of all possibilities. Whatever the means for presenting the interlaced images to the lenticulated surfaces used in the invention, it is important to align it within tolerable limits with the longitudinal axes of individual lenticules to assure image quality and separation.

In preferred embodiments, the spatial frequency of the lenticulated panels and interlaced images are arranged with respect to one another to compensate for parallax effects which would otherwise be present when the flat panels are observed at customary viewing distances. Preferably, the spatial frequency of the interlaced images are adopted as fixed and the spatial frequency of the lenticulae is made higher by a factor approximately in the ratio of the viewing distances to their respective planes, adjusted for refraction effects of the lenticules themselves as needed.

The interlaced images are preferably carried on multipaneled, printed, inserts that are folded to be compliant so that, when inserted into a box, they are resiliently urged to lie flat, within tolerances, against the plane containing the loci of focal lines of the lenticulae. Preferably, the panels of the inserts are adjusted in length so that when folded a bow is induced in the panel to provide it with a spring action when compressed or to assume a predetermined curve when free standing.

DESCRIPTION OF THE DRAWINGS

The structure and operation of the invention, together with other objects and advantages thereof, may best be understood by reading the detailed description in connection with the drawings in which unique reference numerals have been used throughout for each part and wherein.

BACKGROUND

Figure 1:
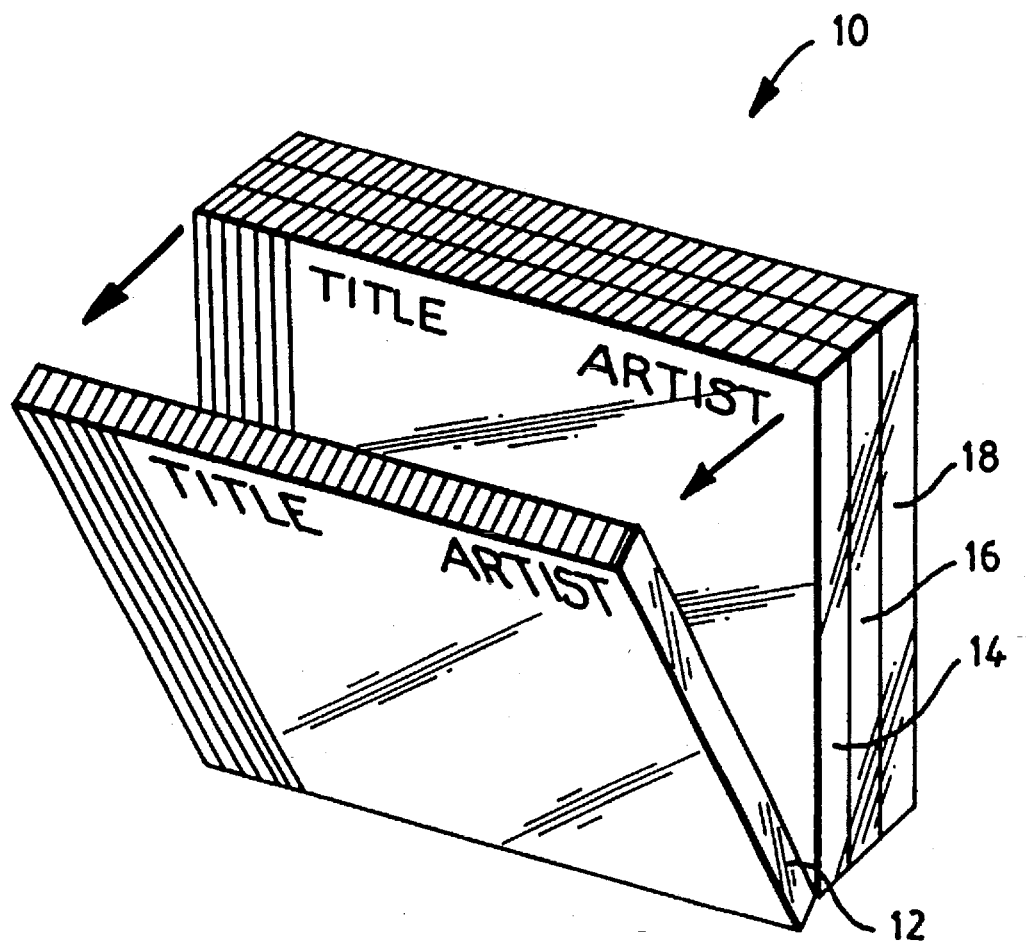
FIG. 1 is a diagrammatic perspective view of a plurality of conventional CD jewel boxes stacked to illustrate the identification problem a consumer usually encounters during the buying process.

Reference is now made to FIG. 1 which shows a stack of flat storage and display box systems for compact discs. The stack is generally designated at 10 and comprises a plurality of individual boxes 12, 14, 16, and 18, which are all identical and of conventional design for storing and displaying compact discs (CDs) such as those for recording and playing back audio information. However, it will be understood that other forms of information such as data, video, multimedia, or graphics could just as easily be recorded on such CDs.

Figure 2:
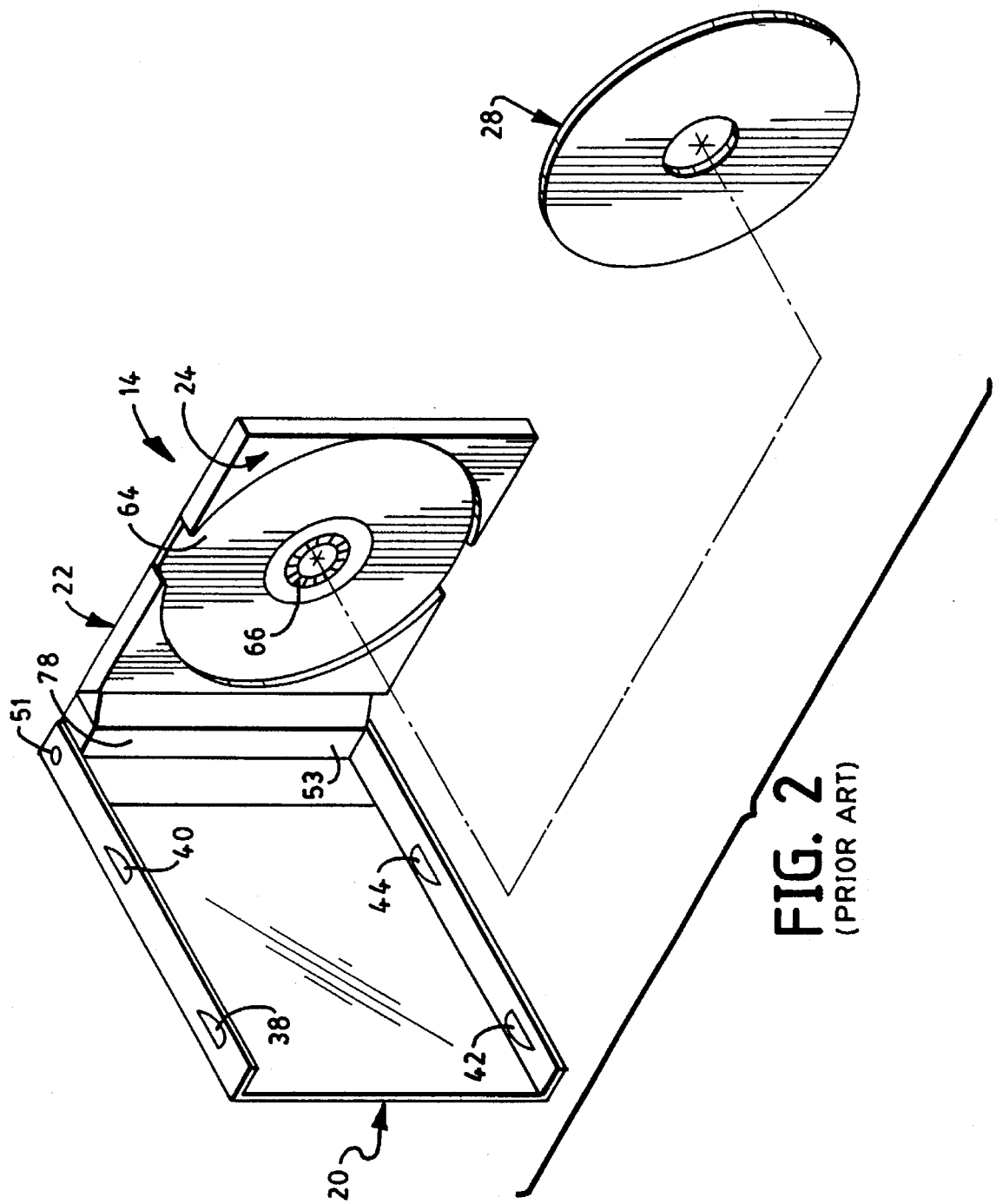
FIG. 2 is a diagrammatic perspective view of a conventional CD jewel box shown in its opened position along with a compact disc.
Figure 3:
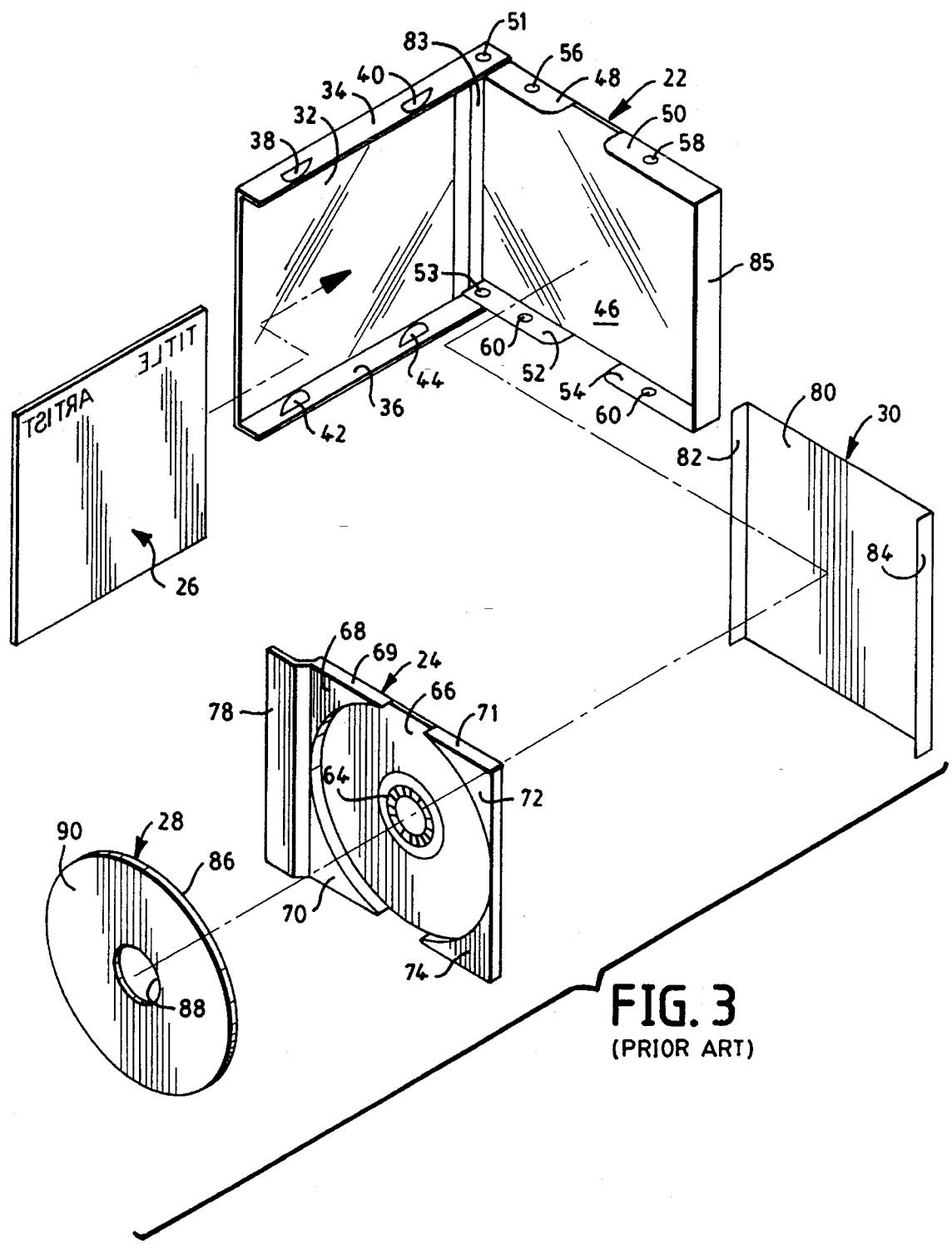
FIG. 3 is an exploded diagrammatic perspective view of a conventional CD jewel box and its various contents including a CD, program insert, and base insert with folded edges.

As best seen in FIGS. 2 and 3, each compact disc box system, considering box 14 as exemplary, comprises the following major components: a front cover 20, a rear base 22, a compact disc carrier or holder 24, an informational booklet 26, which typically carries printed graphical and textual information describing the recorded contents of the box, a compact disc 28 which bears recorded information, and a folded printed insert card 30, which typically carries a shortened textual and graphic description of the contents of the recorded information.

Front cover 20, rear base 22, and disc holder 24 are all injection molded of a suitable plastic with a wall thickness of about 1.2 mm. Overall, each box measures about 142 mm×124 mm×10.4 mm as pictured in FIG. 1 in their closed state.

Typically, front cover 20 and rear base 22 are transparent and molded of styrene or polycarbonate, while disc holder 24 may be made of either transparent or opaque plastic, colored as desired.

Referring now to FIG. 3, it can be seen that front cover 20 comprises a front flat panel 32 which has upper and lower raised edges 34 and 36, respectively. Upper raised edge 34 has a pair of spaced apart tabs, 38 and 40, extending outwardly therefrom while lower raised edge 36 is provided with a similar pair of tabs, 42, and 44. Tabs, 38 to 44, are configured and arranged to have corresponding edges of booklet 26 slide underneath them to retain it with its front surface against the rear surface of transparent front cover panel 32. In this manner, information carried on the front page of booklet 26, such as the title and artist's name for an audio disc, can be clearly seen through the front surface of front cover 20. Booklet 26 is automatically inserted into the space or "pocket" formed between the rear surface to the front cover 20 and the oppositely facing surfaces of the tabs. This is achieved through the use of high speed equipment designed especially for this purpose and widely available throughout the industry. Part of this invention, as will be seen, is to provide informational inserts, like booklets, that are adapted for use with such high speed equipment while having features particularly suitable to other purposes of the invention.

Rear base 22 also has a transparent flat panel that is designated as 46. Extending outwardly from flat panel 46 are a plurality of raised edge sections 48, 50, 52, and 54. Raised edge sections, 48 and 52, are provided with shallow circularly symmetric holes that cooperate with short complementarily configured posts on the back end of front cover upper and lower edge, 34 and 36, respectively, to provide a pair of pivots, 51 and 53, respectively. Pivots, 51 and 53, permit front cover 20 and rear base 22 to be hingedly connected to one another for movement between open and closed positions.

Folded insert 30 comprises a flat panel section 80 and two raised end edges 82 and 84, all of which can carry printed textual or graphical information. Typically, edges 82 and 84 carry just textual information.

During the assembly of a typical box storage and display system, insert 30 is usually automatically placed in rear base 22 with its information bearing section 80 against the rear surface of transparent flat panel 46 so that it can be readily perceived from the opposite surface by a CD user or customer.

In this connection, the information carried on raised edges 82 and 84 can be seen, respectively, through left and right edges, 83 and 85, respectively, of rear base 22. Left edge 83 in this instance corresponds to the hinge edge of a typical box system.

Compact disc holder 24 functions to retain insert card 30 flush with the rear surface of rear base flat panel 46 and to retain a compact disc in place. For these purposes, disc holder 24 comprises a circular tray section 66 with a flexible hub 64. Extending above circular tray section 66 are four raised edge sections, 68, 70, 72, and 74, located at the four corners of disc holder 24 and shaped to provide a rim for protecting the peripheral edges of a compact disc.

Each raised edge section, 68–72, includes raised dimples (only two shown), such as those at 69 and 71, that are adapted to be snap-fitted with corresponding tab section detent holes, 56–62, in rear base 22. In this manner disc holder 24 snaps into and is retained in rear base 22.

Compact disc 28 is seen to be a flat circular object with a front surface 86, rear surface 90, and central circular mounting hole 88. Front surface 86 carries recorded information with rear surface 90 typically carrying printed information identifying the CD recorded contents by title and artist or the like.

CD 28 is held in place by disc holder 24 with its recorded information bearing surface 86 against the front surface of circular tray 66 so that it is protected against damage. To accomplish this, a user simply aligns flexible hub 64 with circular hole 88 and then pushes against compact disc 28 until it compresses the flexible fingers of hub 64 inwardly. Further inward pressure causes the flexible fingers by design to expand after certain portions clear the thickness of a CD to trap disc 28 in place.

Disc holder 24 also includes a rectangularly shaped raised deck 78 that protrudes through front cover 20 near the hinge edge. The deck is usually provided with surface serrations extending along its longitudinal direction to provide a grip for ease of handling by the user and during manufacture.

In the assembled state as shown in FIG. 1, the information bearing surfaces in such compact disc storage and display box systems can usually only be seen by flipping through them in the manner illustrated. Because of the display arrangements adopted by retailers, it is typically only possible to flip through boxes to scan the information appearing through their front covers to identify their contents. The alternative is to pick the box up and examine all of its sides for the needed information. No information can be seen through either top or bottom edges in the position in which they are usually displayed, and the information that might be seen through the hinge or right edge of a box system is also obscured in this display position.

As will be seen in the following description, the foregoing problems with the conventional CD storage and display box systems are solved with novel optical arrangements for providing a user or customer with more and different opportunities for more easily observing information about the contents of CDs and for enhancing the opportunities for more creative advertising approaches to marketing CDs.

DETAILED DESCRIPTION

Figure 4:
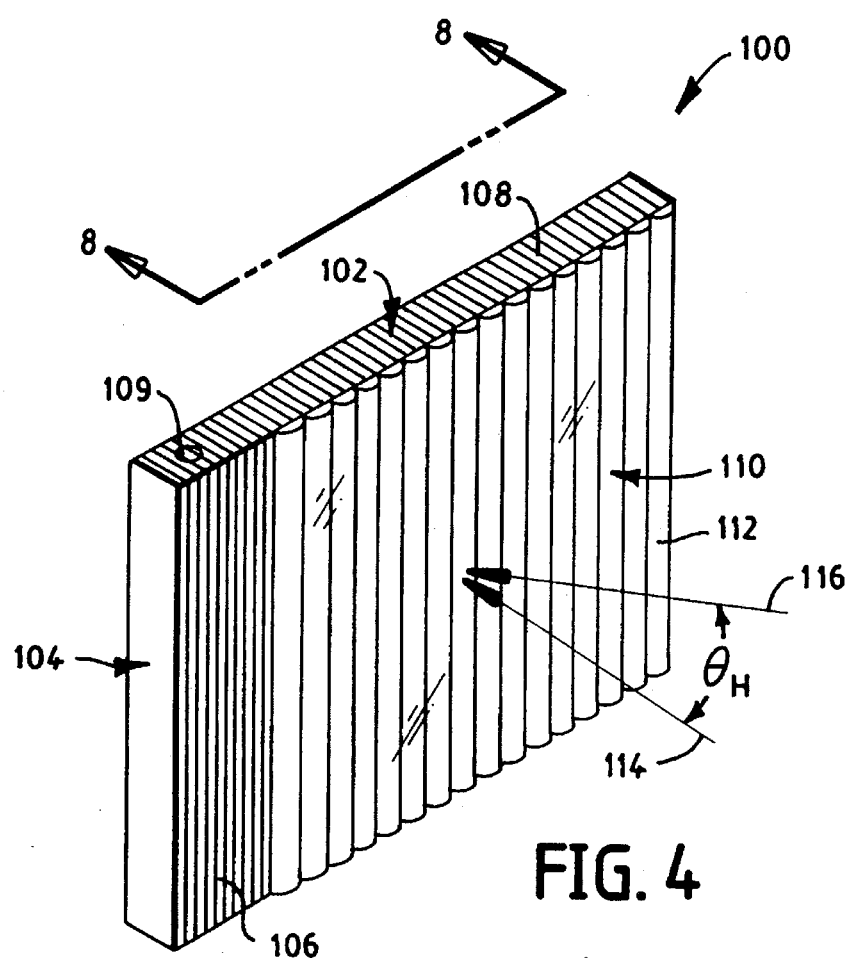
FIG. 4 is a diagrammatic perspective of an inventive compact disc box system having a vertically oriented lenticulated front panel.

Referring now to FIG. 4, there is shown an embodiment of the inventive box system designated generally at 100. Box system 100 comprises a front cover 102 hinged to a base 104 about a pair of pivots (one of which is shown at 109 in one of two raised side walls, only one of which is shown at 108). Inside of box system 100 is a compact disk holder of conventional design and having a grooved deck 106 which is more easily gripped for ease of handling.

Front cover 102 is preferably molded of a durable plastic such as styrene or polycarbonate and includes a transparent, flat, lenticulated panel 110 in which there are formed in its front surface a plurality of vertically oriented adjacent individual lenticules 112 which make up a lenticular array or section. While lenticules 112 are shown enlarged many times, it will be appreciated that in practice they are small, having spatial frequencies ranging between, for example, 1 to 10 lenticules per millimeter.

Figure 6:
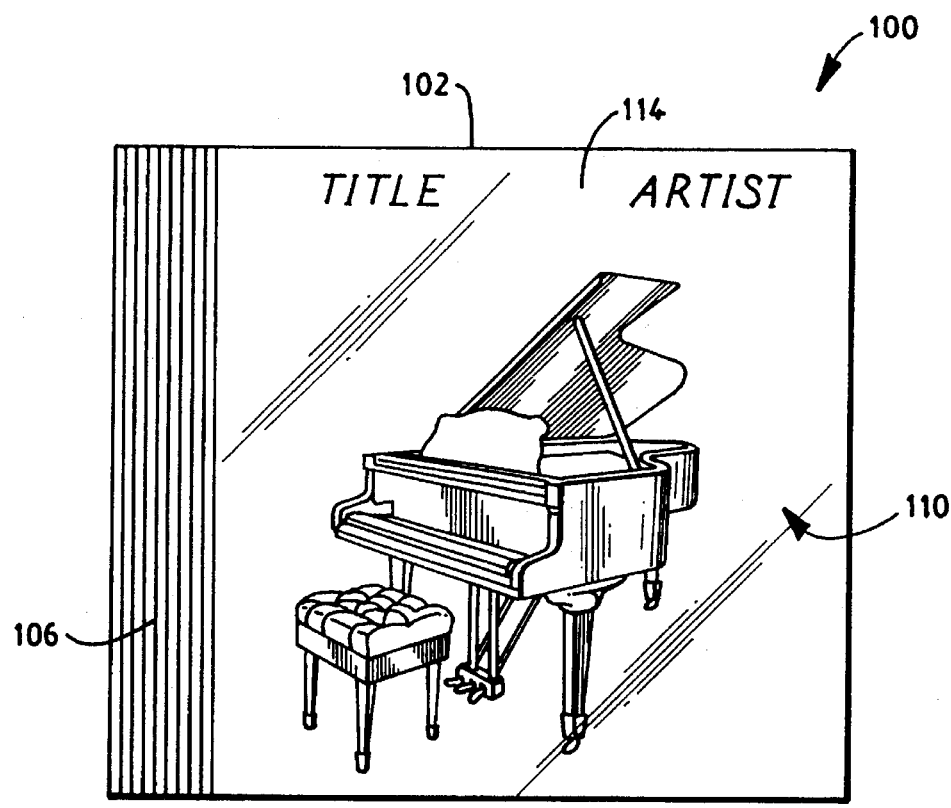
FIG. 6 is a diagrammatic vertical elevational view of the view presented to an observer looking along a first path of observation at the front of the compact disc box system of FIG. 4.
Figure 7:
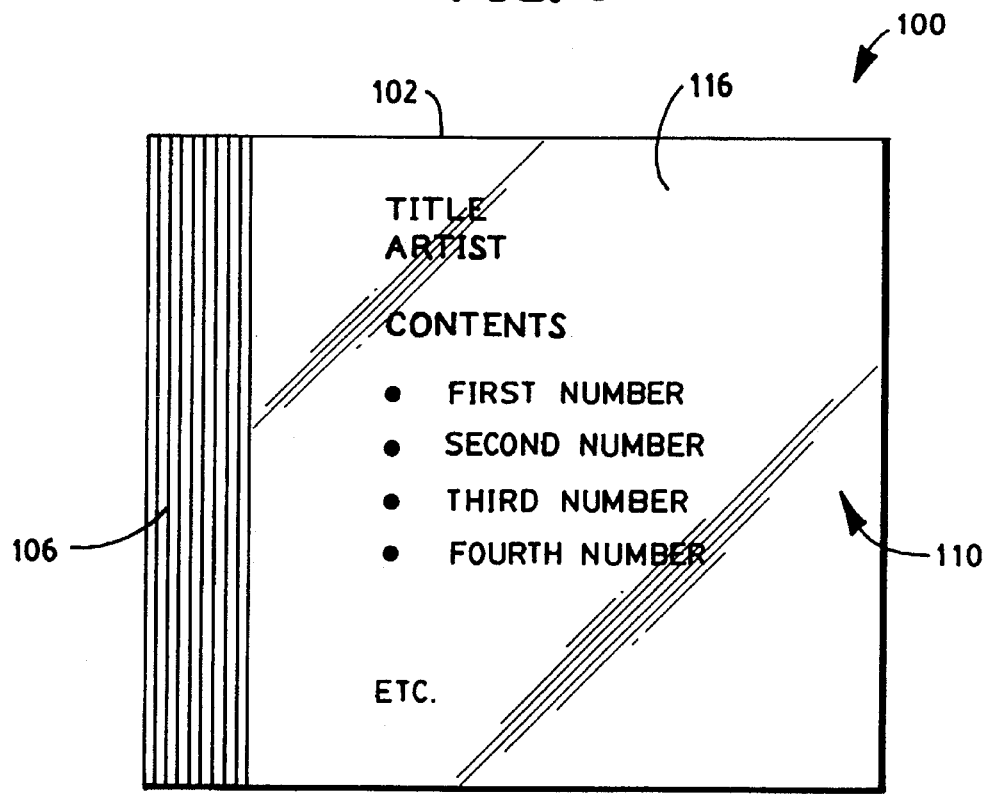
FIG. 7 is a diagrammatic vertical elevational view of the view presented to an observer looking along a second path of observation, angularly separated from the first in the horizontal plane, when looking at the front of the compact disc box system of FIG. 4.

Information in the form of interlaced printed images resides in a plane behind the front cover lenticulated section, and lenticulated front panel 110 operates in a manner to be described to provide an observer with two different images depending on the angle at which front cover 102 is observed. Because of the vertical orientation of lenticules 112, the two available views are separated in angle in a horizontal plane or azimuth perpendicular to front cover 102. In FIG. 4, the arrows designated at 114 and 116 indicate by way of example the angular separation between such views, and FIGS. 6 and 7 show examples of the different type of messages that an observer may see along such paths of observation. As shown in FIG. 6, an observer may be presented with a logo, title and/or artist information regarding the contents of a CD while viewing along the path designated as 114. Along path 116, slightly to the right of path 114, an observer can see the contents of individual numbers on the CD, as in the case of an audio CD.

While two separate views have been illustrated in connection with the description of the embodiment of FIG. 4, it will be appreciated that more than two views are quite feasible depending on the number of interlaced images provided, and such views of different information may also be presented to an observer viewing the flat wall of rear cover 104 as well. It should also be appreciated that such views can periodically repeat themselves as the angle of view over the surface of the lenticulated surface.

Figure 5:
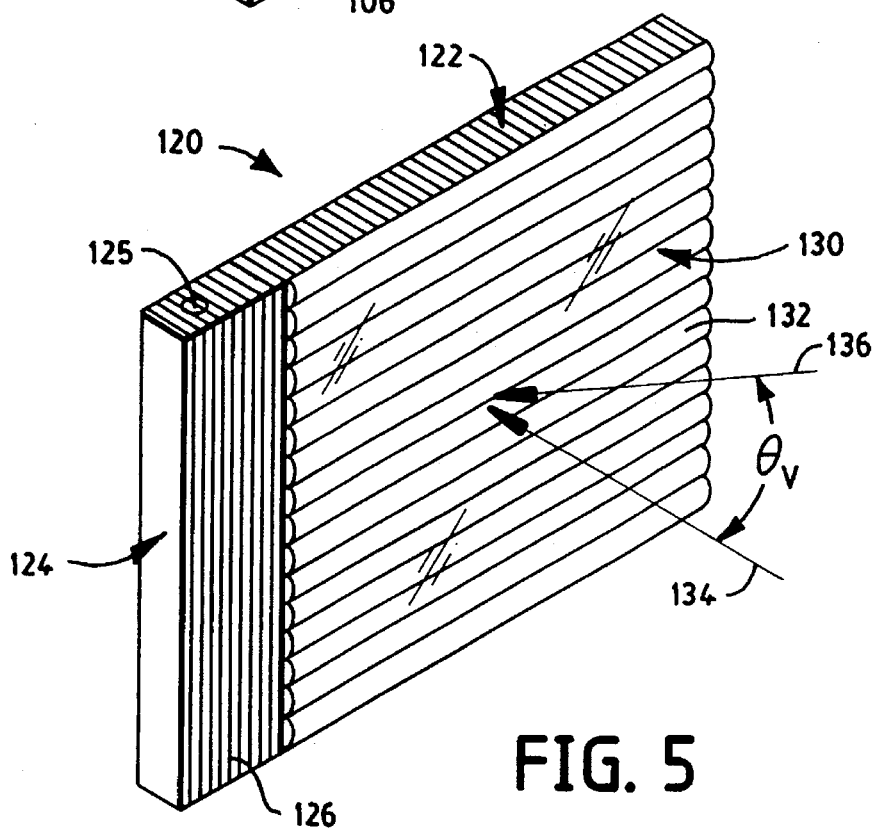
FIG. 5 is diagrammatic perspective of an inventive compact disc box system having a horizontally oriented lenticulated front panel.

In FIG. 5, an alternate embodiment of the invention is presented. Here, a box system 120 comprises a front cover 122 pivotally hinged to a rear base 124 via a pair of pivot points (one shown at 125). Box system 120 also has a conventional disc holder with a deck 126 that protrudes through a cutout in front cover 122. Deck 126 and a front cover side 128 have serrations or grooves as before for improving gripping and handling.

Front cover 122, as before, is injection molded of plastic in a well-known manner and includes a flat, lenticulated front panel 130 having a plurality of horizontally oriented, side-by-side, parallel lenticules 132. Lenticules 132 operate as before to provide two informational views that, in this instance, are angularly separated vertically in a plane that is perpendicular to the longitudinal axes of lenticules 132. Here, the views, which may be used to present different observable messages, are designated as 134 and 136, and there information may well be identical to that shown in FIGS. 6 and 7 or something altogether different.

Figure 8:
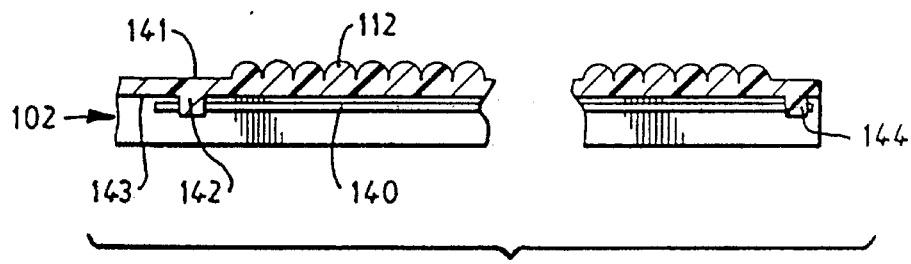
FIG. 8 is an enlarged, diagrammatic, fragmented vertical cross-sectional view of a portion of the box system of FIG. 4 taken generally along line 8—8 therein.

In FIG. 8, there is an enlarged cross-sectional, elevational view of the box system 100 taken generally along line 8—8 of FIG. 4. As can be seen, front flat panel 142 comprises a front surface 141 and rear surface 143. In front surface 141 are formed the plurality of lenticules 112. Each lenticule operates in a well-known manner as a cylindrical lens to form line images in one azimuth corresponding to its longitudinally extending axis.

An information card 140 is provided so that its front surface is at or near contact with rear surface 143. Information card 140 bears an interlaced image, i.e., the images of the various views to be presented to a viewer broken up into tiny adjacent image strips, alternately one image segment form one view and so on over the entire image. The interlaced images are placed behind lenticules 112 so that different combinations of them can be seen along the different perspectives; each lenticule 112 providing a view of part of the whole image which collectively are perceived as a synthesized whole by the observers visual system without notice of the lenticules themselves because of their size in relation to the visual acuity of the eye.

The insert or informational card 140 may be positioned laterally and vertically through the use of locating pins 142 and 144 which fit into corresponding holes provided in it. Any suitable means such as resilient means may be provided to keep the insert card 140 pressed against rear surface 143 to assure that the printed matter on card 140 is located at the proper distance from the loci of focal lines lenticules 112.

Figure 9:
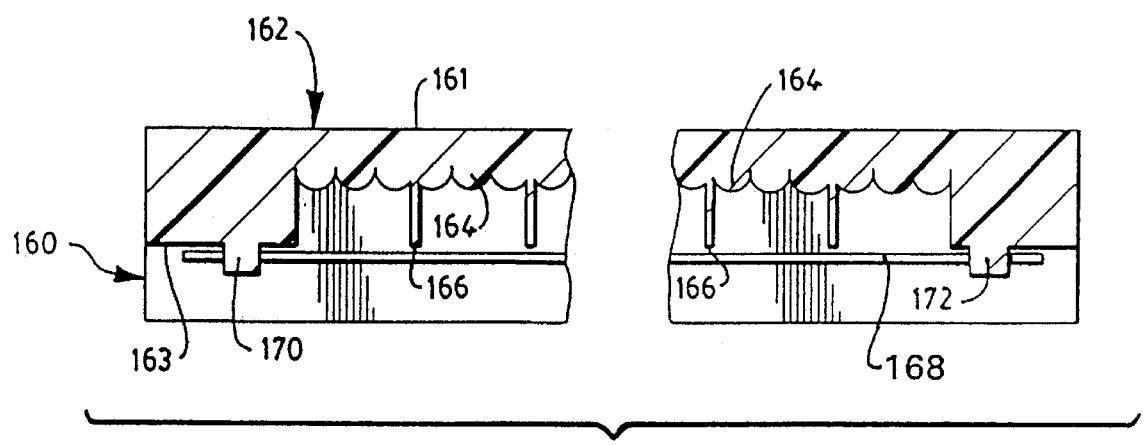
FIG. 9 is an enlarged, diagrammatic, fragmented vertical cross-sectional view of another embodiment of the invention in which the lenticulated surfaces of the front cover are located internal to a box.

FIG. 9 shows an alternate embodiment of the invention where the lenticules may be located on the interior of an inventive box system designated generally at 160. Here, there is a transparent flat panel 162 injection molded with flat exterior surface 161 and a rear interior surface 163. Formed in interior surface 163 are lenticular cylindrical grooves 164 that are separated by small isolation pillars 166 whose bases lie in plane of surface 163. As shown, grooves 164 are preferably formed in groups of two, three, or more. Isolation pillars operate to prevent cross talk between grooved lenticules 164 and thus keep the interlaced images from intermingling as well as maintaining the distance between the information bearing card and the lenticules.

An information bearing card 168 is placed against surface 163 and the bottoms of pillars 166 to provide the interlaced image to lenticules 164, and information card 168 is registered with lenticules 164 via a pair of locating pins 170 and 172.

Where it is desired to utilize existing high-speed, industry wide equipment to insert informational materials, such as printed materials, in the box system of the invention, approaches other than the use of registration pins may be beneficially used for alignment purposes, keeping in mind that such materials must be aligned within acceptable visual tolerances with respect to the loci of focal lines of the lenticular surfaces, i.e., they must be flat over the area of visual interest, and must not be twisted, or tilted, with respect to the longitudinal axes of the lenticules. More particularly, informational inserts such as booklets must be self flattening and preferably fit into the space provided between the current retention tabs and the flat surface carrying the lenticular screen so that current molds do not need to be modified especially to accommodate the inventive informational materials.

The depth of space available between the retention tabs and the flat surface carrying the lenticulars is approximately 0.085 to 0.090 inches. With typical paper thickness used for booklets, for example, running at about 0.005 to 0.006 inches, it is clear that, even for booklets consisting of multiple panels, a substantial amount of available space must be filled to hold any instructional materials in place and properly aligned with the lenticules both axially and laterally. Moreover, since any informational insert, particularly those for use in the front cover, is suspended over a large span between oppositely facing tabs, it must be stiff perpendicular to this direction and resilient in a direction opposite so that it will flatten against the lenticulars over their whole area within the tolerances dictated by the depth of focus of the optics. For a circle of confusion of about 0.005" (visual acuity) and acrylic, this depth of focus is about plus or minus 0.008 inches.

Figure 10:
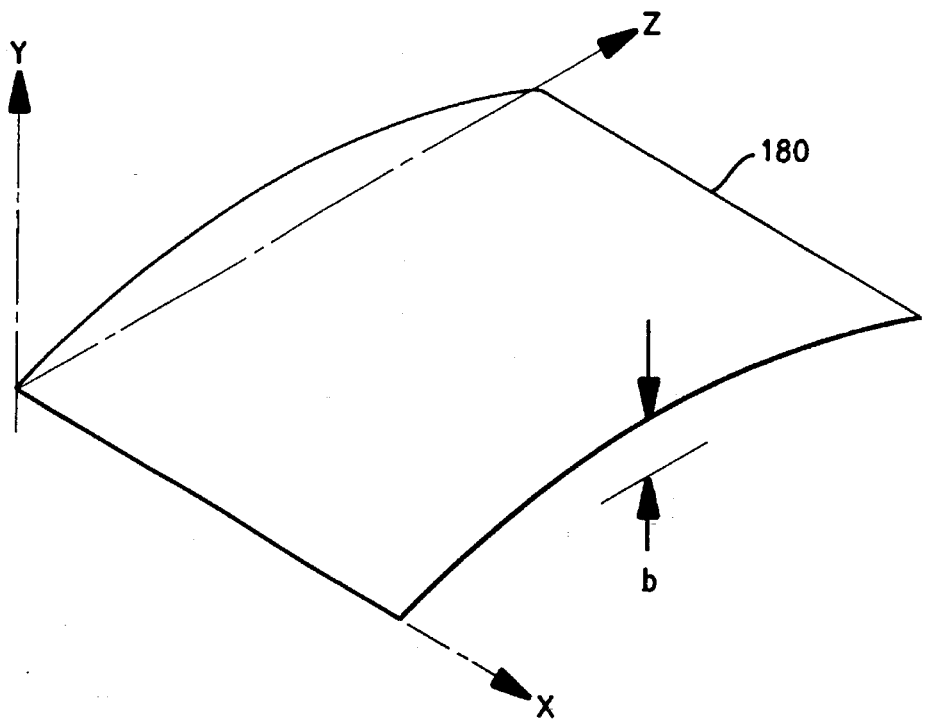
FIG. 10 is a diagrammatic perspective view of a bowed or curved compliant or resilient image carrying insert in accordance with the teachings of the invention.
Figure 11:
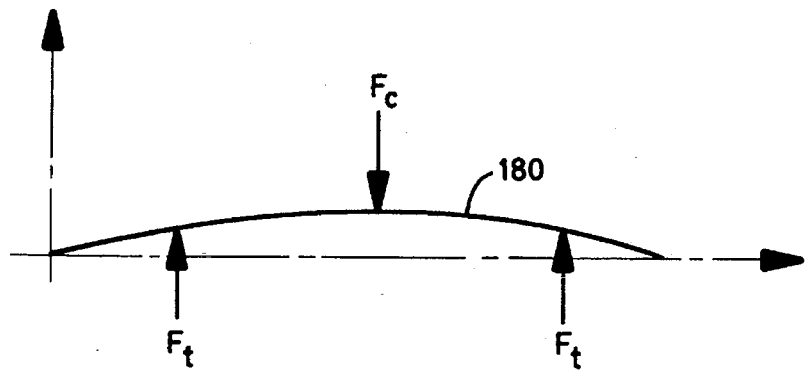
FIG. 11 is a diagrammatic side elevational view illustrating the loading on the insert of FIG. 10 when placed in a box system of the invention.
Figure 12:
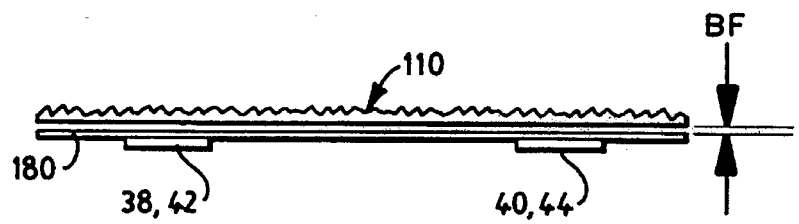
FIG. 12 is a diagrammatic elevational view illustrating the geometric relationships between the insert of FIG. 10 and the rear surface of a lenticulated cover and tabs of a box system of the invention when subjected the forces illustrated in FIG. 11, particularly showing that the insert takes on a flattened shape with respect to the loci of the back focal lines of the lenticulated cover.

To solve this problem several inventive embodiments of informational inserts have been made based on the principle illustrated in FIG. 10, which shows an insert that has resiliency or compliance when in a free standing state. As seen, the insert shown at 180 has a natural bow or curvature, b, when free standing. If one pushes on insert 180, it will compress and return to its free state when the force is released, i.e., it exhibits elastic behavior. Consequently, insert 180 is structured with properties that provide it resiliency in one azimuth while adding stiffness along the azimuth perpendicular to it (See FIG. 10). The insert is stiff in the x-y plane and resilient or compliant in the y-z plane. When such a structure interacts with the rear surface of the lenticular front cover and the tabs the static reactions at the tabs, $F_t$, and the resultant force bearing against the lenticulated surface caused by the cover, $F_c$, (See FIG. 11) introduce moments tending to flatten the art work out as shown in FIG. 12. Here, BF represents the foci of back focal lines of the lenticules on cover 110. Obviously, the thickness of such inserts also plays a role in filling up the space between the tabs and lenticulated surface as well and must, in conjunction with its resilient properties be accounted for.

Figure 13:
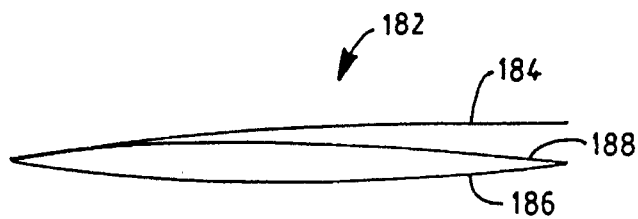
FIG. 13 is a diagrammatic side elevational view of a preferred, multipaneled booklet that may be used in the practice of the invention showing that, in its free standing folded configuration, the booklet is bow shaped and compliant.
Figure 14:
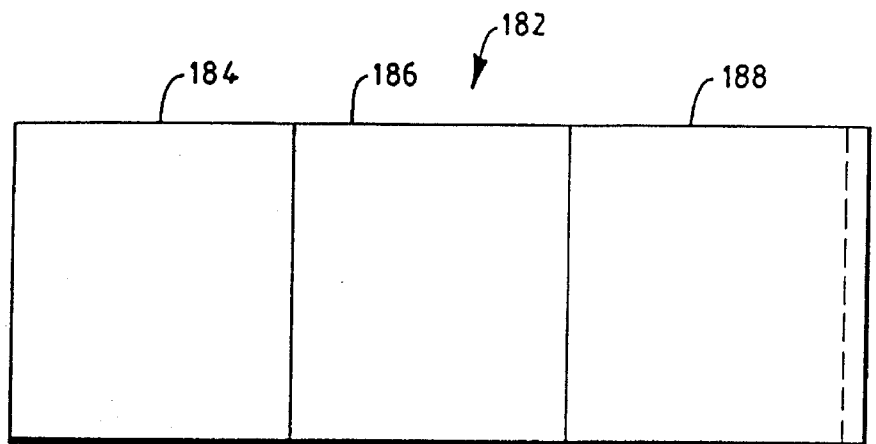
FIG. 14 is a diagrammatic, unfolded plan view of the booklet of FIG. 13.

Various approaches to making such inserts with the needed properties have been found useful. FIG. 13 shows a double folded, multiple panel, booklet 182 having three panels, 184, 186, and 188, having sharp creases between them, with the free edge of inwardly folded panel 188 entering the first crease formed between panel 184 and 186. Here, the lengths of the panels are selected so that, when folded, the edge of the last panel folded interferes with the first crease to cause the last panel to buckle under the induced compression set up in this way. This, in turn, creates the compliance needed, and the compliance may be adjusted as required by a simple length adjustment. For example, as shown in FIG. 14, the last panel to the right (188) may be made longer than the two to the left of it (184 and 186), or alternatively, in one preferred embodiment, the outer two panels may be of the same length and the middle one made shorter. Clearly, this approach makes for a reliable method of controlling resilient properties by controlling length instead of the characteristics of the creases and material properties on which information is printed.

Figure 15:
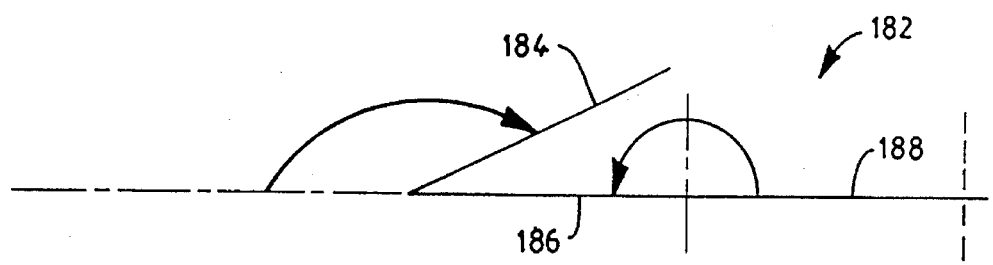
FIG. 15 is a diagrammatic illustration showing how the multipaneled booklet of FIGS. 13 and 14 is folded to achieve the configuration of FIG. 13.

FIG. 15 shows the sequence for folding booklet 182. Panel 184 is first folded on top of panel 186 with a sharp crease formed between them. Then, panel 188 is folded over panel 186, between panel 184 and 186, so that it is sandwiched between them. Again, a sharp crease is formed between these latter two.

Figure 16:
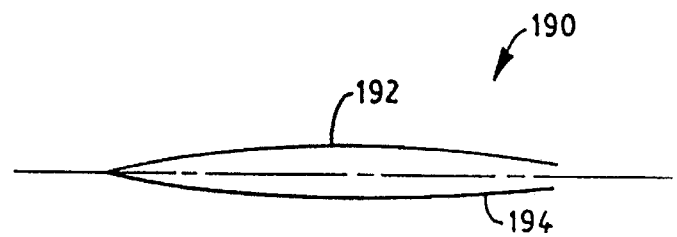
FIG. 16 is a diagrammatic, side elevational view of another embodiment of a compliant image carrying insert of the invention.

FIG. 16 represents a single fold insert 190 having two panels 192 and 194, both of which bow individually to form a collective bow. Here, the inside surface of the material forming insert 190 is provided with a coating causing the material to curl towards the coated side. The insert can be practiced with either a gentle or sharp crease. Instead of a coating, it is also possible to create this configuration with suitable heat treatment such as ironing.

Figure 17:
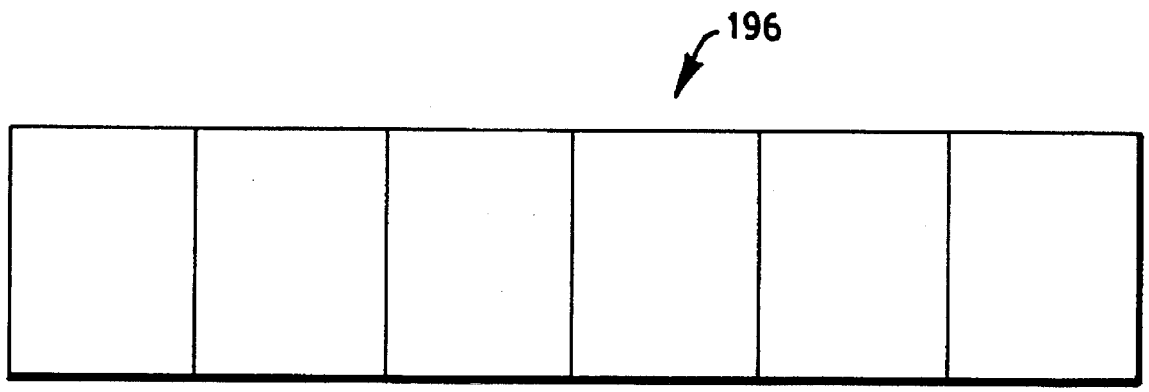
FIG. 17 is a diagrammatic plan view illustrating yet another multipaneled booklet of the invention.

FIG. 17 shows a six panel booklet 196 that is about 0.030 inches thick in its folded condition. In use, this booklet must be configured as with booklet 182 so that at least one panel interferes with the crease between two others to provide the resilient properties needed, and this may be achieved empirically if needed.

Figure 18:
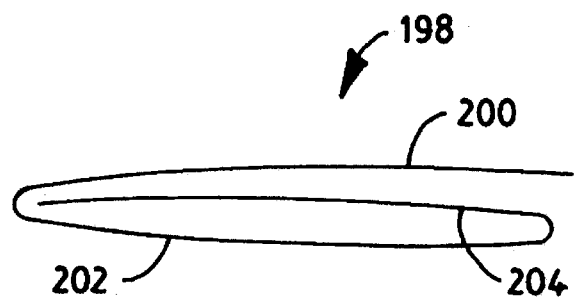
FIG. 18 is a diagrammatic, side elevational view of yet another multipaneled compliant insert of the invention.

FIG. 18 shows a multipanel insert 198 consisting of panels 200, 202, and 204. Here, instead of sharp creases between panels, gentle creases are used with the free end of the inwardly folded panel 204 not entering the first crease. The material properties of the insert and the gentler crease operate to provide spring sections that tend to separate the panels, forcing them to want to unfold. This type of approach can be made to either expand on its own to fill available space or be compressed within the space available. In either case, the art work is flattened with respect to the lenticulated surface.

It will be understood that tab placement can be adjusted as needed to induce the proper bending moments to cause informational inserts to flatten out against the optics. However, to change the current tab positions would be a very costly proposition which can be avoided with the present invention.

Figure 19:
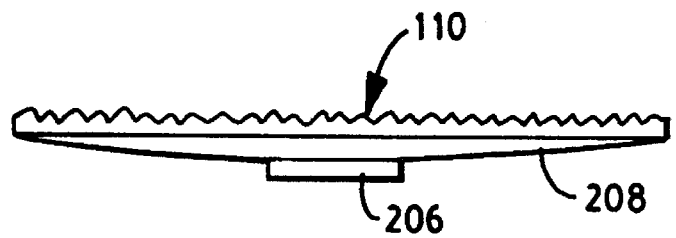
FIG. 19 is a diagrammatic, side elevational view of another embodiment for the box system of the invention illustrating how one tab may be used with a compliant image carrying insert that is bowed oppositely than others of the invention.

FIG. 19 uses a single central tab 206 in conjunction with a single panel 208 with a curl coating. It bends oppositely to the others. Non-curl versions could also be used provided the cud were in the right direction.

It is also possible to use combinations of folded printed materials in conjunction with flexible, thin springs. For example, panel 188 of FIG. 13 may instead be a separate piece of polymeric material heat treated to induce a gentle curvature to provide it with springiness. Such a piece could be assembled with the informational material prior to insertion in a box. Moreover, such springy inserts need not be placed between folded panels but could just as well be located behind inserts as a separate piece.

In addition to the need to have the informational inserts flat with respect to the optics, they must also be parallel to the longitudinal axes of the lenticules to within limits or adverse visual effects can occur in the form of ripples that become apparent across the face of the viewed field. What has been found preferable is to keep the interlaced images parallel to the longitudinal axes of the lenticules to within ½ or less the width of a single segment of an interlaced image resident behind a lenticule over the length of the art work of interest. Consequently, if the art work is long, this tolerance is more demanding than if short. However, what is interesting is that the art work can slide perpendicular to the lenticules without objectionable visual problems; one just sees the different views in different orders. Even so, the tilt must remain within the above limits to avoid rippling. This means that the edges of multiply folded panel inserts must be straight to within this tolerance, or at least one of them such as 181 in FIG. 14 used for registration against a box side wall must be straight, while the others may deliberately be skewed in the opposite direction to avoid any conflict in this regard. Interestingly, while the inserts can move in parallel fashion transverse to the longitudinal axes of the lenticules without introducing visual artifacts, so long as any tilt is kept within bounds, edges skewed in the direction opposite that of the reference can provide springiness in the plane of the insert to keep it in place perpendicular to the axes of the lenticules. Otherwise, the effect of slight movement in this plane is to simply change the order in which one sees the different views.

Also, it is to be understood that the various inserts described may be rotated ninety degrees and still work even though the bowing is now also at ninety degrees to those inserts shown.

Figure 21:
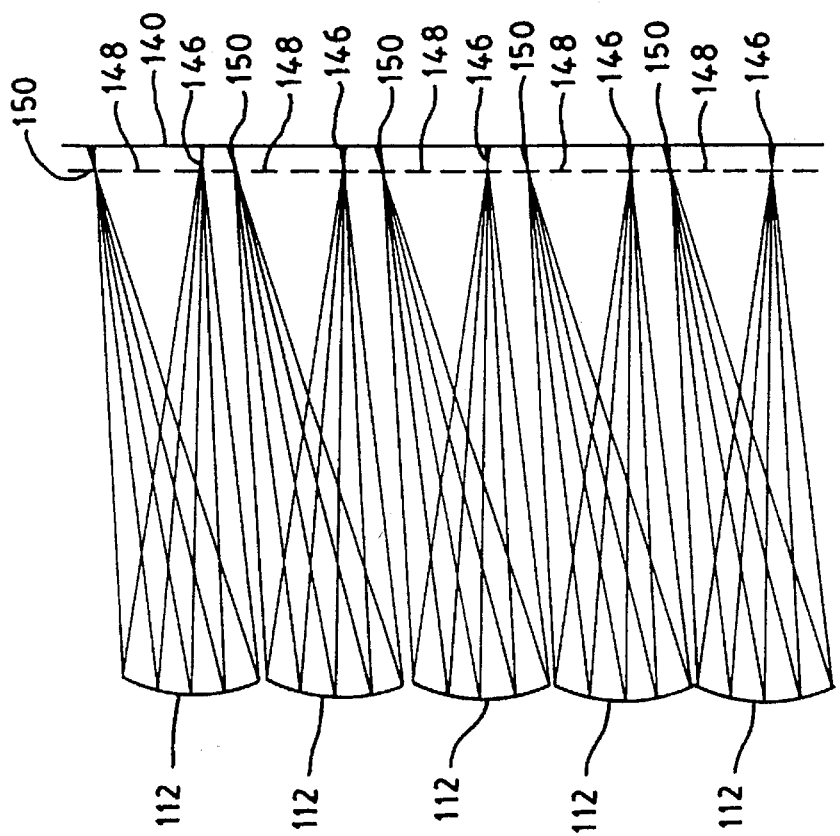
FIGS. 20 and 21 are diagrammatic drawings taken transverse the longitudinal axes of lenticulated panels used in the inventive box systems tracing the paths various light rays take in traveling to different segments of interlaced images formed on information bearing cards used in the inventive box systems.
Figure 20:
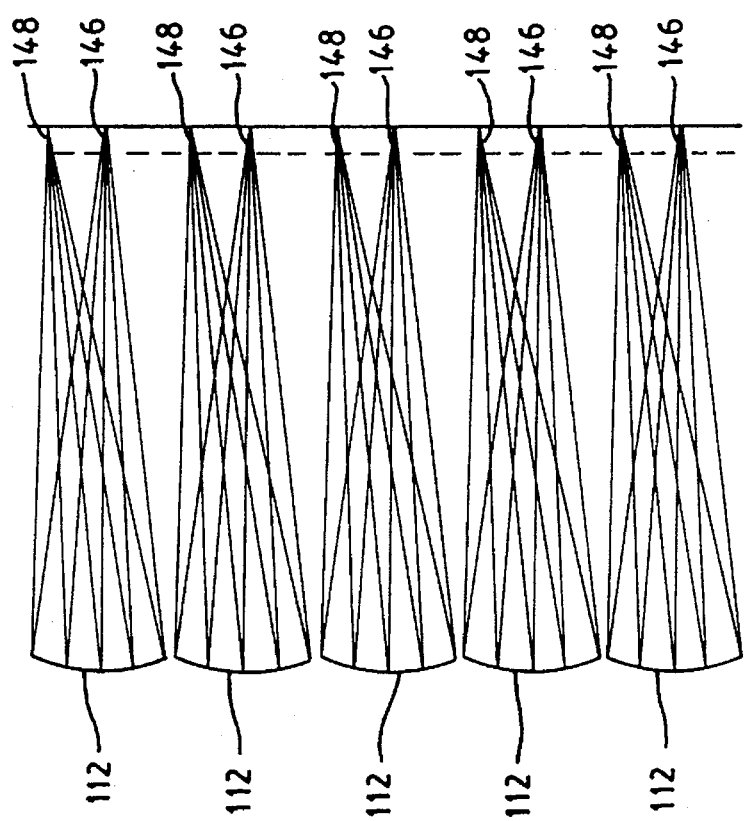

FIGS. 20 and 21 show the principle of operation of the lenticular panels used in the box systems of the invention. Both figures are traces illustrating the paths that certain light rays take in traveling from different portions of the interlaced images used in the invention to provide the different views for a particular lenticule design. Here, the ray traces were done for lenticules 112 that are made of styrene with an index of refraction of 1.59, have a radius of 0.0285 inches, and an apical focal distance of 0.058 inches, i.e., the distance from the front surface on the axis to the optimal focus of a lenticule, here the dashed line which represents the interlaced image. The informational card actually resides behind this location by a distance of 0.003 inches so that there is an air gap of this amount between the front surface of a card (140) and the dashed line.

In FIG. 20, an observer looking straight along the axis of lenticules 112 sees behind each lenticule 112 a different segment of the whole image where each segment is designated at 146. If the observer looks along a line of sight that is at 10 degrees with respect to the axis, image segments designated at 148, which correspond to a different image, can be seen while those designated at 146 cannot.

In FIG. 21, image segments 150 are seen at an angle of observation inclined to the axis at 20 degrees so this may represent yet another message or a repeat of a previous message slightly shifted.

Figure 22:
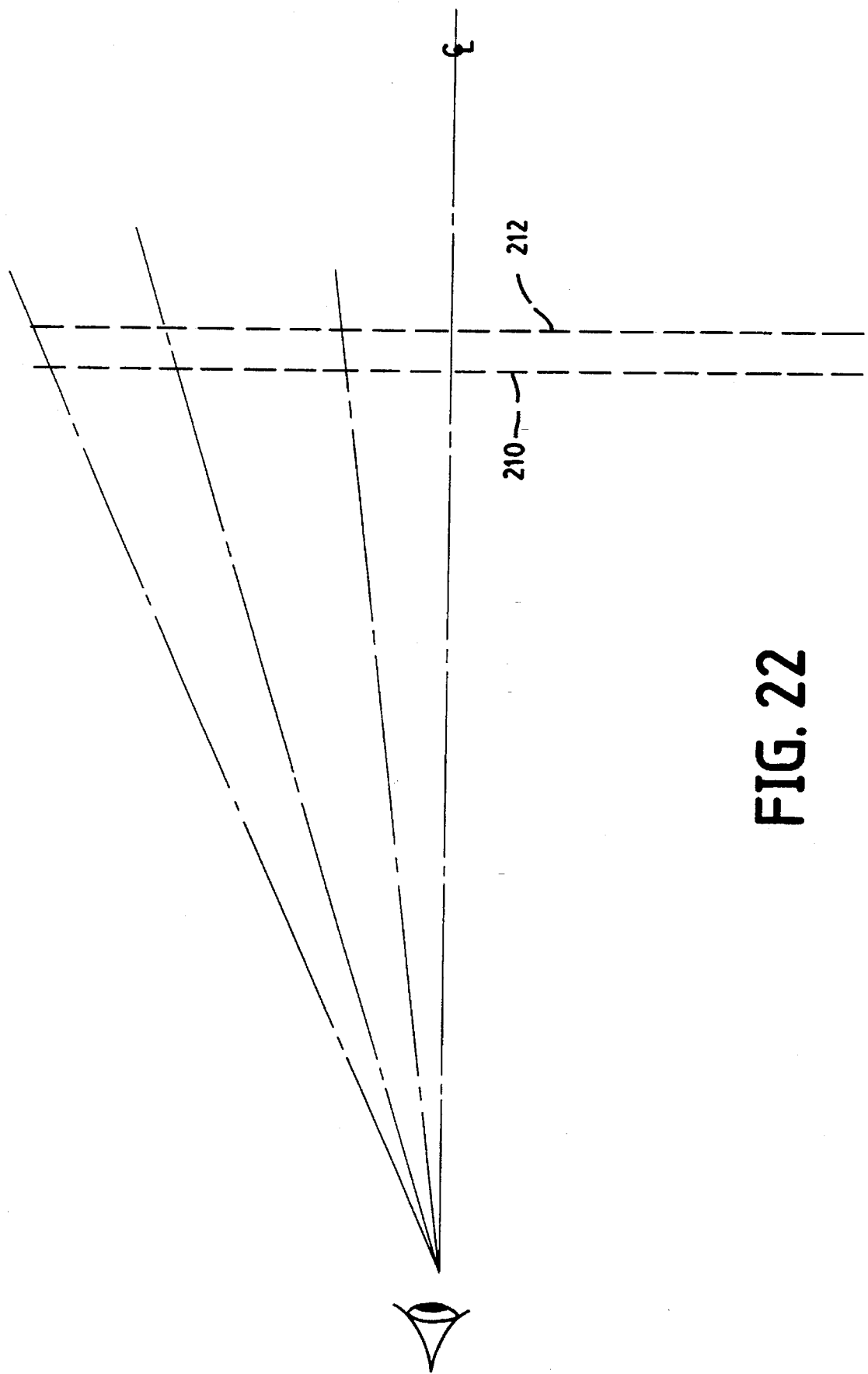
FIG. 22 is a diagrammatic view illustrating the nature of parallax effects that are corrected by certain features of the invention.

Reference is now made to FIG. 22, which illustrates, the parallax effect that can occur in using the invention if the size of the box becomes large in relation to the interpupillary distance of the eye or the viewing distance is correspondingly small in relation to the overall image size. The parallax effect comes about because of a displacement of the chief ray passing through the center of each lenticule with respect to its corresponding image segment as the angle of observation of a lenticule increases compared with the normal to that lenticule. The result is that every chief ray, if not corrected for this effect, does not pass through its correct interlaced image segment. The visual result is a softness or bluriness in changing from one view to the next or poor separation between views. The phenomenon is shown heuristically in FIG. 22. Let 210 represent the lenticules with a given spacing (assume thin lens theory applies) and 212 represent the interlaced images at the same spatial frequency of the lenticules. Here, the dashes for the interlaced images in 212 can comprise just one image or several images in the allocated space. For purposes of the illustration, they can be assumed to represent one image segment, but the argument applies if they represent more than one.

As can be appreciated, the lenticules and images line up perfectly just like one picket fence behind another, and when one looks through a lenticule normal to it (the lenticules are transparent), one sees a corresponding image segment right behind it. However, when viewing 212 at some angle other than normal incidence, it is clear that one no longer sees the proper corresponding image segment. Instead, the line of sight begins to walk away from the proper image segment as the viewing angle increases until the proper image is missed altogether. This results in a partial view of both images simultaneously, a generally undesirable result.

Figure 23:
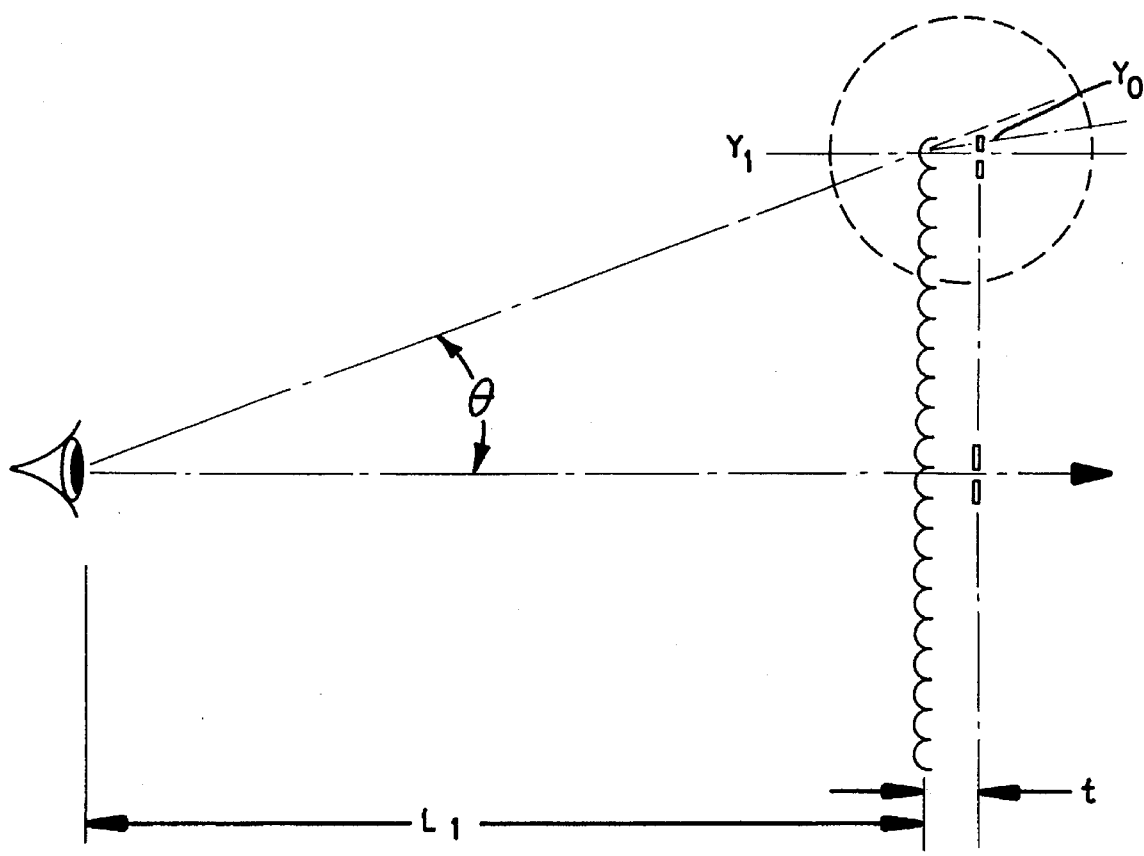
FIG. 23 is a diagrammatic illustration showing in more detail how the parallax effects of FIG. 22 occur as a result of differences in the angle of perspective from which an observer "sees" different segments of interlaced images of the invention.
Figure 24:
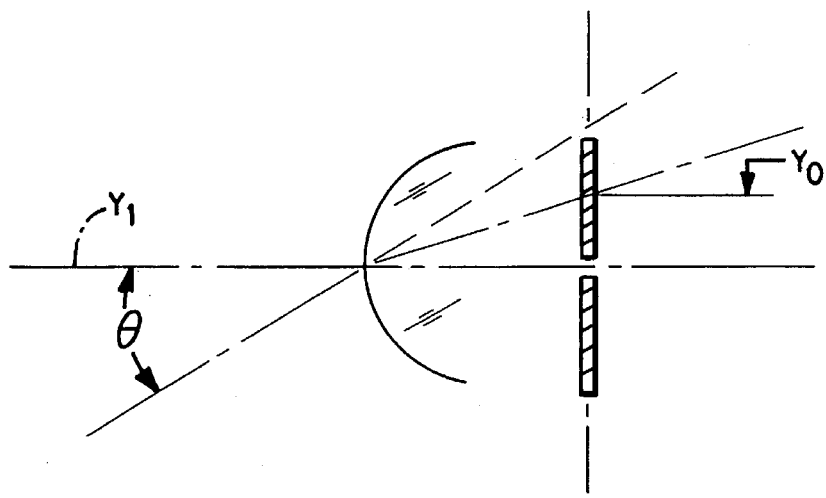
FIG. 24 is a diagrammatic illustration showing the origins of a visual parallax effect that exists without the corrective features of the invention.

FIGS. 23 and 24 show in more quantitative terms exactly by what amounts the chief ray "walkoff" problem is. More particularly, let $y_o$ be the ray height of the chief ray for any lenticule as a function of the angle of observation, θ0 and vertical position of the y-intercept of an incoming ray. Then $θ_o=θ/n$, where n is the index of refraction of the lenticular material and $L_1$ is the viewing distance. Then, $$y_o = y_1(1+t/nL_1)$$

If one lets, $f_o$=the spatial frequency of the interlaced images, then to compensate for the progressively larger errors in $Y_o$ with increasing viewing angle, then, $f_1$, the spatial frequency of the lenticules for a box of wall thickness, t, is given by:

$$f_1 = f_o(1+t/nL_1)$$

Thus, the parallax effect may be compensated for exactly for any assumed viewing distances or optimized over a range of viewing distances.

While the preferred way of correcting for parallax effects is to increase the spatial frequency of the lenticules to progressively drop the center of each lenticule downwardly with increasing angle, it is to be understood that the spatial frequency of the lenticules may also be adjusted or both can be altered to address the parallax problem. However, it is somewhat easier to build the correction into the molding tool and use available printing techniques to achieve the spatial frequency of the interlaced images.

Figure 25:
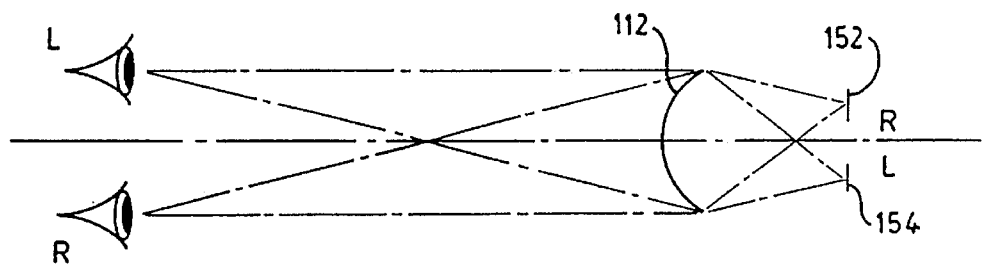
FIG. 25 is a diagrammatic plan view illustrating the principle of operation of the lenticulated surfaces of the invention.

FIG. 25 diagrammatically shows how the interlaced images and lenticules may be used to provide stereo image sets, such as stereo pairs, so the view of the box system front cover may be a stereo image. Here, the system is arranged so that the left eye sees a left stereo image segment behind the right side of a lenticule 112 while the right eye sees a right stereo image segment behind the left side of a lenticule 112. The overall effect is for the right and left eyes to have presented to them full left and right stereo image pairs. Here, again, parallax effects can be corrected in the manner previously described.

Figure 26:
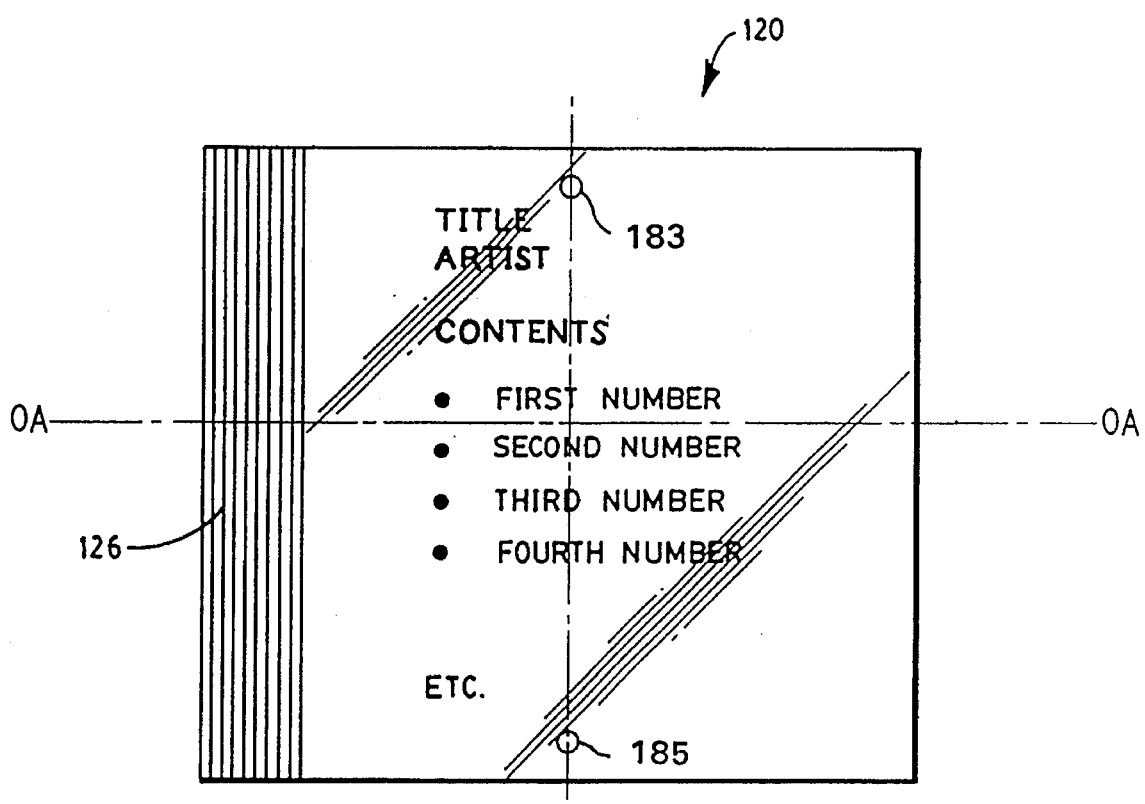
FIG. 26 is a diagrammatic front elevational view of the box system of FIG. 2 shown with additional elements to illustrate the importance of alignment of informational material with the longitudinal axes of the lenticulated surfaces of the invention.

FIG. 26 illustrates the importance of proper alignment of the informational content of the card with the longitudinal axes of the lenticules used in the invention. If the longitudinal axis is taken to correspond to the horizontal axis, OA, of a lenticule, then the registrations pins, such as those designated at 183 and 185, are preferably positioned at right angles to achieve proper alignment. This would be true if the optical axis of a lenticule ran vertically rather than horizontally as shown. However, when insert edges are used for alignment, the edges run parallel, or nearly so, to the longitudinal axes of the lenticules.

Figure 27:
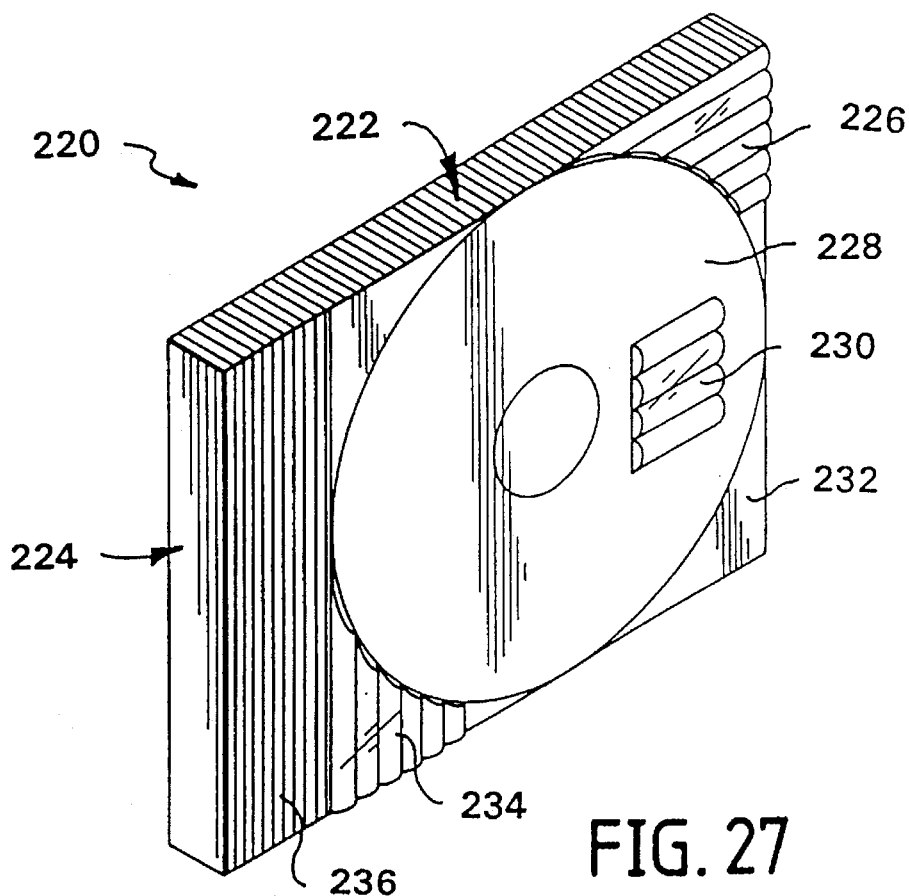
FIG. 27 is a diagrammatic perspective view of another embodiment of the invention showing a plurality of lenticulated surfaces carried on the front cover of an inventive box system to display various information which may be carried on the front surface of a compact disc or disc holder, rather than on a card insert as in other embodiments.

FIG. 27 shows another embodiment of the invention in which a plurality of lenticulated segments are employed on different parts of a front cover to provide different messages or visual effects.

This embodiment is a box system 120 that has a front cover 222, rear base 224, and compact disc holder deck 236. Front cover 222 includes a molded flat panel 232 having differently oriented and located lenticulated segments 234, 226, and 230. Segments 198 and 200 are horizontally oriented with segment 234 being vertical. A clear circular segment 228 generally corresponds to the area of a compact disc, except for the presence of lenticulated segment 230.

Figure 28:
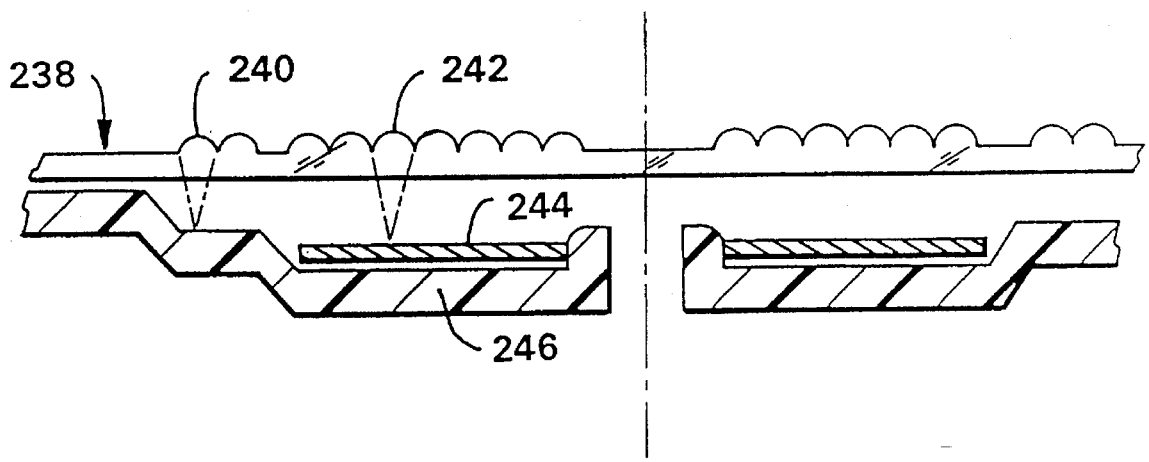
FIG. 28 is a an enlarged, diagrammatic elevational cross-section of a fragment of an alternate embodiment similar in concept to the box system of FIG. 27.

These segments, as well as those previously illustrated, may be made to interact with properly registered informational messages located not just on informational insert cards but on interlaced images placed on different conventionally available CD structures. FIG. 28, for example, illustrates additional possibilities. Here, a front cover segment 202 has a lenticulated front surface that is provided with different lenticules that have been optically designed to interact with interlaced messages located on different levels of existing CD box structure. Lenticules 240, for example, are provided with a focal length for observing an interlaced message located on an available surface of an otherwise conventional compact disk carrier 246. Lenticules 242 on the other had are structured with a longer focal length to observe an interlaced image located on the front surface of a compact disc 246, which would, of course, have to be properly oriented. The principle illustrated is that the invention may be implemented through the use of a diversity of combinations of lenticulated panel segments with interlaced images on the interior of a box system where those interlaced images may be present as printed cards or be located on other surfaces of existing conventional structure. Interlaced images may, for example, be hot stamped on available surfaces or provided on substrates that are transparent rather than opaque or on adhesive labels or the like, and all of these possibilities are within the scope of the teaching of the invention. All of the possible interlaced images described herein may be fabricated in any well-known manner as, for example, with photographic techniques employing appropriated masks or more recently available computer image manipulation techniques employing computer technology.

It should also be understood that it is not necessary to form the lenticulated wall sections of the invention as unitary structures integrated with structural walls themselves since it is within the teaching of the invention to attach separately formed lenticulated wall sections to otherwise smooth wall sections by using suitable adhesives or other means of attachment. In doing so, locating pins such as those indicated at 142 and 144 in FIG. 8 and at 170 and 172 in FIG. 9 may be used on both sides of a flat wall section to simultaneously register a separate lenticulated wall section with an information bearing card or the like located at the optimal focal plane of the lenticules employed. Moreover, it will be understood that the lenticulated structures of the invention, including compensation for parallax effects, may be integrated with the front, back, and side wall surfaces along with interior surfaces, such as disc carriers, as well.

Those skilled in the art may make other changes to the invention without departing from the scope of its teachings. Therefore, it is intended that the embodiments described herein be considered as illustrative and not be construed in a limiting sense.

What is claimed is:

1. A box system for containing at least one flat object and providing visual information about the flat object, said box system comprising:

a multisided flat box comprising a pair of opposed flat walls interconnected by a plurality of shallow side walls to provide an interior chamber for the flat object, said pair of opposed flat walls and said plurality of shallow side walls being joined to releasably receive the flat object, at least one of said pair of opposed flat walls having a transparent lenticulated section composed of a plurality of parallel lenticules having a focal plane optically associated therewith;

a compliant insert bearing at least two interlaced preprinted images, said compliant insert being removably insertable into said interior chamber and located in a plane substantially parallel and proximate to said transparent lenticulated section so that said interlaced preprinted images are in optical registration therewith, said compliant insert being further located substantially in said focal plane of said transparent lenticulated section to provide different information to an observer looking at said transparent lenticulated section from different angular perspectives.

2. The box system of claim 1 wherein said compliant insert comprises a multi paneled, preprinted sheet folded with creases formed between folds so that it is resiliently urged against said transparent lenticulated section such that it is substantially flat with respect thereto when inserted into said interior chamber.

3. The box system of claim 2 wherein said panels of said multi folded preprinted sheet are of different lengths so that, when folded, at least one of said panels interferes with the crease formed between two others to create a bow in said insert thereby making it resilient.

4. The box system of claim 2 wherein said panels of said preprinted sheet are coated on one side to cause them to curl towards said coated side to provide said compliant insert with resilient characteristics when said panels are folded with their coated sides facing one another.

5. The box system of claim 2 wherein said panels of said multi folded preprinted sheet are folded with gentle creases so that when said compliant insert is free standing, said gentle creases tend to cause said panels to unfold thereby providing said compliant insert with said resilient characteristics.

6. The box system of claim 1 wherein said opposed flat walls and said shallow side walls are molded of transparent plastic and said transparent lenticulated section is integrally molded with one of said opposed flat walls thereof.

7. The box system of claim 1 wherein said transparent lenticulated section is formed on the exterior surface of one of said opposed flat walls.

8. The box system of claim 1 wherein said transparent lenticulated section is formed on the interior surface of one said opposed flat walls.

9. The box system of claim 1 wherein said plurality of parallel lenticules of said lenticulated section are spaced to compensate for parallax effects.

10. The box system of claim 9 wherein said plurality of parallel lenticules of said lenticulated section have a spatial frequency that is higher than that of said interlaced preprinted images.

11. The box system of claim 10 wherein said spatial frequency of said plurality of parallel lenticules of said lenticulated section are given by:

$$f_1 = f_o (1 + t/nL_1)$$

wherein $f_1$ is the spatial frequency of said plurality of parallel lenticules, $f_o$ is the spatial frequency of said interlaced preprinted images, t is the wall thickness of said lenticulated section, n is the index of refraction of said lenticulated section, and $L_1$ is the viewing distance.

12. A box system for containing at least one compact disc, said box system comprising:

a flat base comprising a first flat panel having peripheral edges and shallow raised walls connected around said peripheral edges thereof, a flat front cover comprising a second flat panel also having peripheral edges and shallow raised walls connected around the peripheral edges thereof; said flat front cover and said flat base being pivotally connected to one another for movement between an open position and a closed position in which they fit together to define an interior chamber therebetween for releasably receiving a compact disc, at least one of said first and second flat panels having a transparent lenticulated section composed of a plurality of parallel lenticules having a focal plane optically associated therewith;

a removable compliant insert for placement within said interior chamber for providing information that is in a plane substantially parallel to at least one of said first and second flat panels and in optical registration with said transparent lenticulated section thereof, said compliant insert including at least two preprinted interlaced images located substantially at said focal plane of said transparent lenticulated section to provide different information to an observer looking at said transparent lenticulated section from different angular perspectives.

13. The box system of claim 12 wherein said removable compliant insert comprises a multi paneled, printed, sheet which is folded with creases to be resiliently urged against said transparent lenticulated section so that it is substantially flat with respect thereto.

14. The box system of claim 13 wherein said panels of said multifolded sheet are of different lengths so that, when folded, at least one of said panels interferes with the crease formed between two others to create a bow in said insert thereby making it resilient.

15. The box system of claim 13 wherein said panels of said sheet are coated on one side to cause them to curl towards said coated side to provide said removable compliant insert with said resilient characteristics when said panels are folded with their coated sides facing one another.

16. The box system of claim 13 wherein said panels of said multi folded sheet are folded with gentle creases so that when said removable compliant insert is free standing, said gentle creases tend to cause said panels to unfold thereby providing said removable compliant insert with said resilient characteristics.

17. The box system of claim 12 wherein said flat front cover and said flat base are molded of transparent plastic and said transparent lenticulated section is integrally molded with one of said flat panels of said flat front cover and said flat base.

18. The box system of claim 12 wherein said transparent lenticulated section is formed on the exterior surface of one of said flat front cover and said flat base.

19. The box system of claim 12 wherein said transparent lenticulated section is formed on the interior surface of one said flat front cover and said flat base.

20. The box system of claim 12 further including a compact disc holder adapted to fit between said shallow raised walls said first flat panel of said flat base.

21. The box system of claim 12 wherein said plurality of parallel lenticules of said lenticulated section are spaced to compensate for parallax effects.

22. The box system of claim 21 wherein said plurality of parallel lenticules of said lenticulated section have a spatial frequency that is higher than that of said preprinted interlaced images.

23. The box system of claim 22 wherein said spatial frequency of said plurality of parallel lenticules of said lenticulated section are given by:

$$f_1 = f_o (1 + t/nL_1)$$

wherein $f_1$ is the spatial frequency of said plurality of parallel lenticules, $f_o$ is the spatial frequency of said preprinted interlaced images, t is the wall thickness of said lenticulated section, n is the index of refraction of said lenticulated section, and $L_1$ is the viewing distance.

24. A box system for containing recorded media and providing visual information about the contents of the recorded media, said box system comprising:

a pair of opposed, spaced apart flat walls having at least one major dimension;

a plurality of shallow side walls interconnected between said pair of opposed, spaced apart flat walls and having dimensions that are substantially smaller than said major dimension of said pair of opposed, spaced apart flat walls, at least one of said pair of opposed, spaced apart flat walls having at least one transparent lenticulated section having a plurality of parallel lenticules with a focal plane optically associated therewith, said plurality of shallow side walls and said pair of opposed, spaced apart flat walls providing a multisided flat box with an interior chamber for the recorded media, said pair of opposed, spaced apart flat walls and said plurality of shallow side walls also being interconnected to releasably receive the recorded media; and a compliant insert bearing at least two interlaced preprinted images, said compliant insert being insertable into said interior chamber and located in a plane substantially parallel to at least one of said pair of opposed, spaced apart flat walls of said flat box and in optical registration with said transparent lenticulated section, said compliant insert being further located substantially in said focal plane of said transparent lenticulated section to provide different information about the recorded media to an observer looking at said transparent lenticulated section from different angular perspectives.

25. The box system of claim 24 wherein said plurality of parallel lenticules of said lenticulated section are spaced to compensate for parallax effects.

26. The box system of claim 25 wherein said plurality of parallel lenticules of said lenticulated section have a spatial frequency that is higher than that of said preprinted interlaced images.

27. A box system for containing at least one compact disc, said box system comprising:

a flat base comprising a first flat panel having peripheral edges and shallow raised walls connected to said the peripheral edges thereof;

a flat front cover comprising a second flat panel having peripheral edges and having shallow raised walls connected around the peripheral edges thereof; said flat front cover and said flat base being pivotally connected to one another for movement between an open position and a closed position in which they fit together to define an interior chamber therebetween for releasably receiving a compact disc, one of said first and second flat panels having a transparent lenticulated section optically composed of a plurality of parallel lenticules having a focal plane associated therewith;

a compliant insert for placement in said interior chamber for providing information that is in a plane substantially parallel to and proximate at least one of said front cover and said base and in optical registration with said lenticulated transparent section and said focal plane, said compliant insert having preprinted thereon at least two interlaced images, said focal plane and said compliant insert being positioned to be in optical registration with respect to one another to provide different information to an observer looking at said transparent lenticulated section from different angular perspectives.

28. The box system of claim 27 wherein said plurality of parallel lenticules of said lenticulated section are spaced to compensate for parallax effects.

29. The box system of claim 28 wherein said plurality of parallel lenticules of said lenticulated section have a spatial frequency that is higher than that of said preprinted interlaced images.

30. The box system of claim 29 wherein said spatial frequency of said plurality of parallel lenticules of said lenticulated section are given by:

$$f_1 = f_o (1 + t/nL_1)$$

wherein $f_1$ is the spatial frequency of said plurality of parallel lenticules, $f_o$ is the spatial frequency of said preprinted interlaced images, t is the wall thickness of said lenticulated section, n is the index of refraction of said lenticulated section, and $L_1$ is the viewing distance.

31. The box system of claim 27 wherein said transparent lenticulated section comprises substantially all of the surface area of said flat front cover.

32. The box system of claim 27 wherein said different angular perspectives are angularly separated along a vertical plane when said box system is held in a horizontal plane.

33. The box system of claim 27 wherein said different angular perspectives are angularly separated along a horizontal plane when said box system is held in a horizontal plane.

34. The box system of claim 27 including a plurality of transparent lenticular sections in said flat front cover.

35. The box system of claim 27 wherein said plurality of transparent lenticular sections are oriented along different planes.

36. The box system of claim 27 wherein said parallel lenticules of said transparent lenticulated section are of different focal length.

37. The box system of claim 27 further including a compact disc holder wherein said compact disc holder and said flat base are complementary configured to snap together.

38. The box system of claim 27 wherein said lenticulated section and compliant insert provide stereo pairs to an observer looking along the same direction at said lenticulated section.

* * * * *